May 3, 1927.

E. L. DELANY 1,627,489

FLOAT VALVE FOR FLUSH TANKS

Filed July 3, 1925

Inventor
E. L. Delany.
By C. R. Wright Jr.
Attorney

Patented May 3, 1927.

1,627,489

UNITED STATES PATENT OFFICE.

EDWARD L. DELANY, OF BROOKLYN, NEW YORK, ASSIGNOR TO DELANY REALTY CORPORATION, OF BROOKLYN, NEW YORK.

FLOAT VALVE FOR FLUSH TANKS.

Application filed July 3, 1925. Serial No. 41,352.

My invention relates to improvements in float valves for flush tanks.

The object of my invention is to provide a float valve in which the usual hissing noise which takes place as the valve reaches a point where the water is nearly cut off is prevented, and the means for preventing said hissing comprises a part adapted to be attached to any ordinary float valve.

Another object of my invention is to provide a simple, cheap and effective valve and attachment which will positively accomplish the above results.

In the accompanying drawings:—

Figures 1, 2:
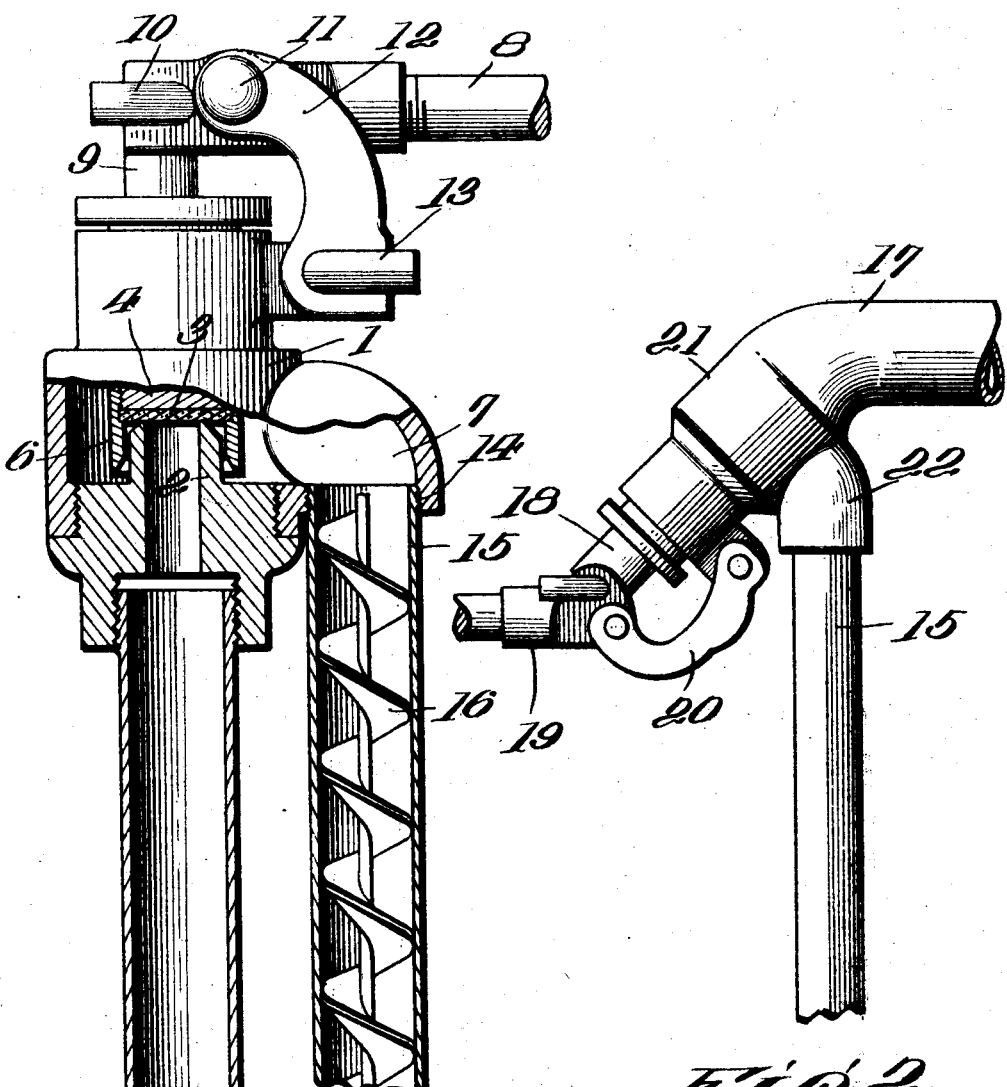
Figure 1 is a side elevation partly in section of a float valve showing my invention applied thereto.
Figure 2 is a side elevation of another form of valve with my invention applied thereto.

Referring now to the drawings, 1 represents a valve casing having a valve seat 2, arranged therein, which is adapted to cooperate with the washer 3, carried by the lower end of the valve 4, and the valve 4 having the guide 5 adapted to encircle the valve seat. Surrounding the valve seat, the casing is enlarged, forming an annular chamber 6, into which the water passes from the space within the guideway of the valve, and thence outwardly through the discharge opening 7. The valve 4 is operated by means of the float lever 8, pivotally connected to the valve stem 9, at 10, and said lever pivotally connected at 11, to the compensating arm 12, which is pivotally connected to the valve casing at 13. I have shown this form of operating mechanism to illustrate the invention, but it will be understood that any form of valve and operating mechanism could be employed. The discharge opening 7 is internally threaded as indicated at 14, and into which is screwed the tube 15, which extends downwardly into the flush tank not shown and which has its lower end submerged so that the water in its passage into the tank will not splash or cause any noise as it enters the tank. Arranged within the tube 15, is a spiral baffle 16, which slightly retards the passage of the water through the tube, causing a back pressure in the discharge opening 7, and also in the annular space 6 surrounding the valve seat, and completely filling the space between the valve seat 2 and the guide 5, with water, and preventing the usual hissing sound which takes place at the last part of the closing of the valve. This is due to the fact that there is a solid head of water in the chamber 6, and also in the space between the valve seat and the guide of the valve.

In the form shown in Figure 2 of the drawings, I have shown my invention as applied to an overhead valve in which the water supply pipe 17 enters from above, and the valve 18 operated by a float lever 19, and the compensating arm 20 constructed somewhat similar to that shown in Figure 1 of the drawings. The valve casing is provided with an annular enlarged portion 21 forming the chamber around the valve and its seat, and having a discharge passage 22 into which is screwed the pipe 15, which like that shown in Figure 1, is provided with the spiral baffle 16 not shown. While I have shown and described the pipe 15 as a separate part of the valve casing 1, it will be understood that the same could be made integral and the baffle 16 placed therein in any desired manner. The broad invention is in providing a baffle in the discharge passage to retard the flow of water from the casing so as to cause a head of water to be at all times maintained in the annular chamber surrounding the valve seat and valve.

Having thus fully described my invention what I claim is:

1. A float valve comprising a casing having an inlet, a raised seat around said inlet, said casing having an enlarged space entirely surrounding the seat above and below the same, and an enlarged discharge passage from the casing, having baffles detachably mounted therein to cause a back pressure in the space around the valve above and below the seat, to prevent hissing during the last part of the closing of the valve.

2. A float valve comprising a casing having an inlet, a raised seat around the inlet, a valve within the casing and cooperating with the seat, said casing having a large space around the valve and the seat and above and below the seat, and a large discharge passage through the side of the casing, and baffle plates in said discharge to cause a back pressure in the space around the valve to prevent hissing during the last part of the closing operation of the valve.

3. A float valve comprising a casing having an inlet, a raised seat around the inlet, a valve within the casing and cooperating with the seat, said casing having a large space entirely surrounding the valve and seat and above and below the seat, a discharge passage from the casing and communicating with the space surrounding the seat, and a pipe removably connected within the discharge and having baffles detachably mounted therein to cause a back pressure in the space around the valve to prevent hissing during the last part of the closing operation of the valve.

In testimony whereof, I have signed this specification.

EDWARD L. DELANY.